United States Patent [19]

Nally et al.

[11] 4,431,322

[45] Feb. 14, 1984

[54] MULTIPLE PATH RECORDING MEANS

[75] Inventors: Robert B. Nally, Waterloo; Edward R. Evans, St. Clements; Lawrence R. Williamson; Trevor A. Calnek, both of Waterloo, all of Canada

[73] Assignee: NCR Canada Ltd - NCR Canada LTEE, Mississauga, Canada

[21] Appl. No.: 420,539

[22] Filed: Sep. 20, 1982

[51] Int. Cl.³ .............................................. B41J 11/50
[52] U.S. Cl. .................................. 400/605; 271/303; 101/93.11
[58] Field of Search ..................... 400/605, 607–608.4, 400/630; 101/93.11, 93.12; 271/301, 303

[56] References Cited

U.S. PATENT DOCUMENTS

| 1,705,945 | 3/1929 | Smith .............................. 400/608 X |
| 3,815,897 | 6/1974 | Hoehl et al. ........................ 271/303 |
| 3,938,435 | 2/1976 | Suda et al. ........................ 271/303 X |
| 4,068,212 | 1/1978 | Templeton .......................... 271/303 |
| 4,074,797 | 2/1978 | Lewis et al. ................. 400/608.4 X |
| 4,109,779 | 8/1978 | Bauer et al. ................. 400/608.4 X |
| 4,192,607 | 3/1980 | Hage ............................... 271/303 X |
| 4,229,113 | 10/1980 | Anderson et al. ................... 400/605 |
| 4,306,712 | 12/1981 | Schroeder ........................... 271/303 |
| 4,381,705 | 5/1983 | Roes et al. ........................ 271/303 |

FOREIGN PATENT DOCUMENTS

| 1282432 | 11/1968 | Fed. Rep. of Germany ...... 271/303 |
| 2724387 | 12/1978 | Fed. Rep. of Germany ...... 271/303 |
| 2830404 | 3/1979 | Fed. Rep. of Germany ...... 271/303 |
| 133922 | 1/1979 | German Democratic Rep. .................................. 400/607 |
| 1010733 | 11/1965 | United Kingdom ................ 271/303 |

Primary Examiner—E. H. Eickholt
Attorney, Agent, or Firm—J. T. Cavender; Albert L. Sessler, Jr.

[57] ABSTRACT

A recording apparatus having multiple recording devices, each recording device being associated with a separate document feed path, in order to provide simultaneous recording on more than one document for the purpose of increasing effective document recording speed. The recording apparatus also includes driving mechanism for driving the documents along the feed paths, selection means for selecting an appropriate document feed path for each document which is introduced to the recording apparatus, and control means for controlling the recording devices, the driving mechanism and the selection means.

8 Claims, 10 Drawing Figures

MULTIPLE PATH RECORDING MEANS

BACKGROUND OF THE INVENTION

The present invention relates to apparatus for recording data on documents at a rapid effective rate.

A need exists for recording apparatus capable of high-speed recording of indicia on large numbers of documents. One example of such a requirement may be found in the banking industry, in check encoding operations, which form a part of a complex processing operation which must be performed in transporting the checks, or the essential information contained on them, from one location to another. Due to the large numbers of checks which are in daily circulation in the modern business world, speed is important in the encoding of such checks to provide data such as identification or amount, for example, thereon.

SUMMARY OF THE INVENTION

The present invention provides recording apparatus employing multiple recording devices associated with multiple document feed paths for the purpose of increasing effective document recording speed.

In accordance with one embodiment of the invention, apparatus for recording data on documents comprises a plurality of drive means for driving documents along a plurality of feed paths, recording means associated with each of said feed paths for recording on said documents, selection means for selecting a desired one of said feed paths for a given document which is introduced to the apparatus, and controller means for controlling the selection means, the drive means and the recording means, whereby recording on documents in more than one feed path may take place.

It is accordingly an object of the present invention to provide a novel and efficient recording apparatus.

A further object is to provide a recording apparatus employing multiple recording devices associated with multiple document feed paths for the purpose of increasing effective document recording speed.

Another object is to provide means for increasing the speed and reliability of encoding of documents.

Another object is to provide a printing apparatus which includes a compact and efficient ribbon feed arrangement.

With these and other objects, which will become apparent from the following description, in view, the invention includes certain novel features of construction and combinations of parts, one form or embodiment of which is herein described with reference to the drawings which accompany and form a part of this specification.

DETAILED DESCRIPTION

Figure 1A:
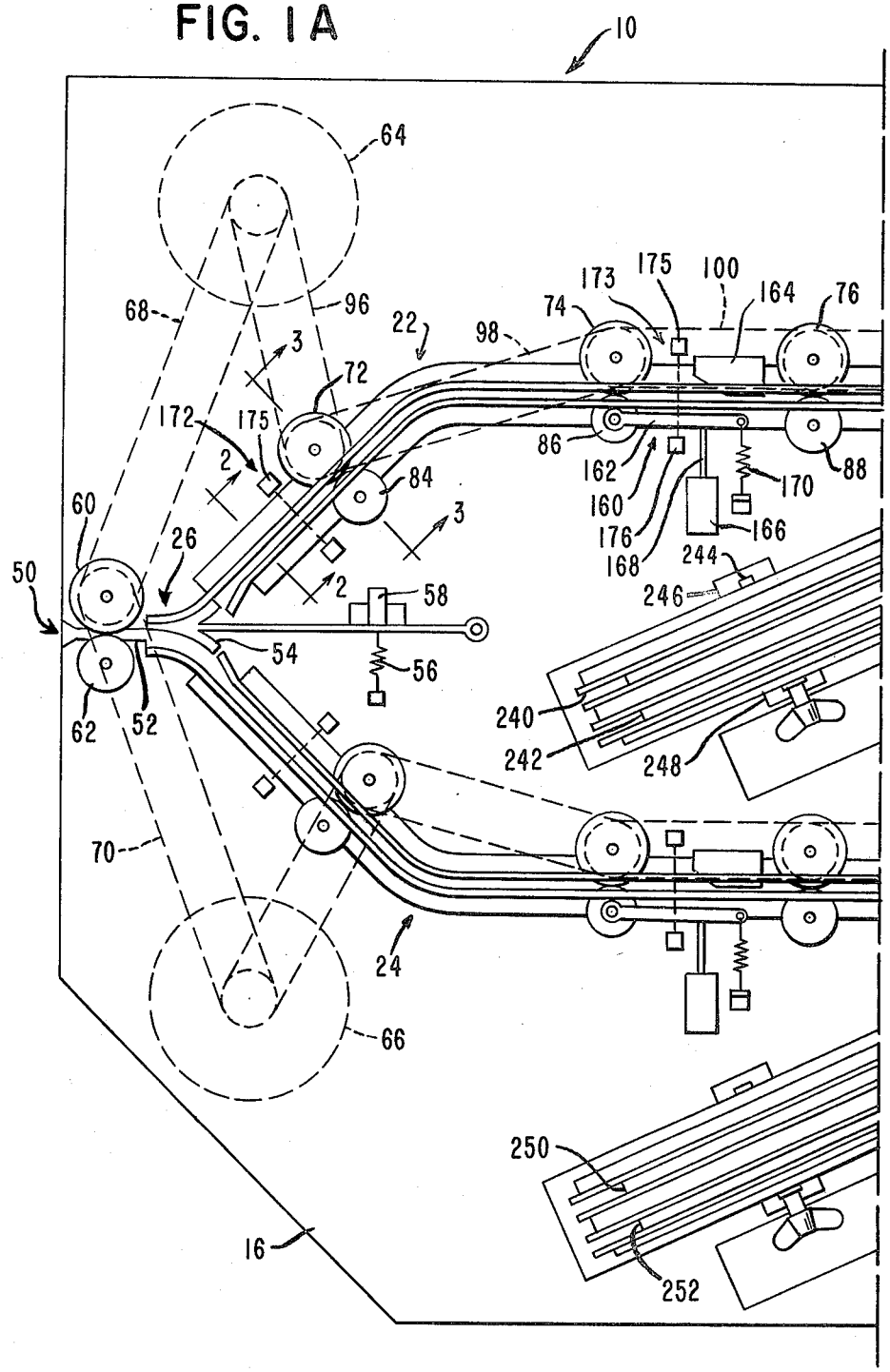
FIGS. 1A and 1B, taken together, constitute a plan view of the illustrated embodiment of the printing apparatus of the present invention.
Figure 1B:
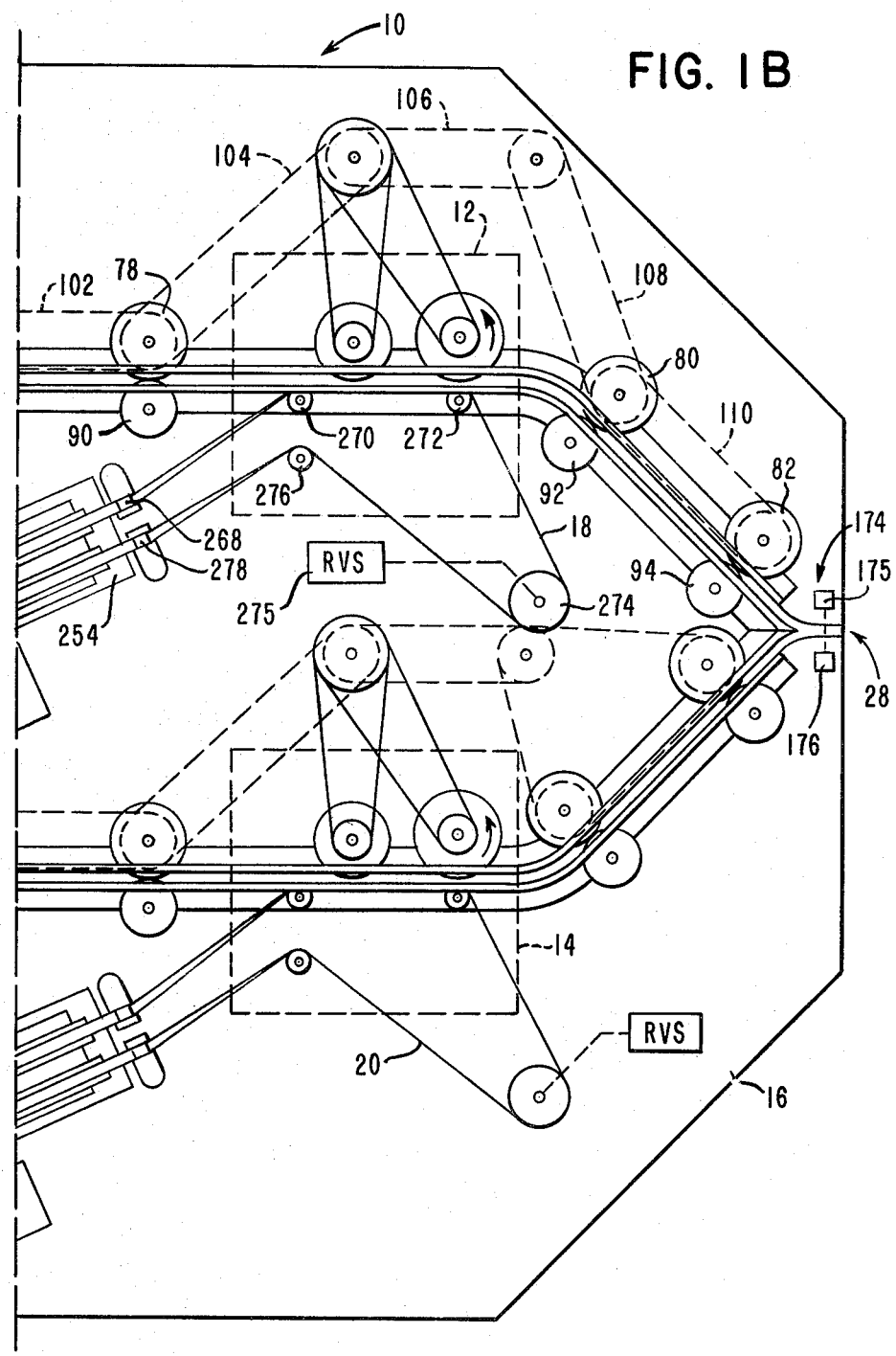

Referring now to FIGS. 1A and 1B, there is shown a multiple-path or track recording or printing apparatus 10 which includes a pair of substantially identical printers or recording devices 12 and 14 mounted on a base 16. The printers 12 and 14 may be of any suitable type, and additional paths or tracks and associated printers could be provided, if desired. In the illustrated embodiment, it will be assumed that the apparatus is employed in a check encoding system, although many other uses are possible; that the printers 12 and 14 are of the impact type; and that they print indicia such as MICR (Magnetic Ink Character Recognition) characters on each check. The printers 12 and 14 utilize magnetic ink character ribbons 18 and 20, respectively, so that the printed indicia can subsequently be sensed by magnetic sensors. The printer 12 is shown in greater detail in FIG. 4, and will subsequently be described.

Two paths or tracks 22 and 24 are associated with the printers 12 and 14 respectively. These paths extend from a point of divergence 26 past the associated printer and to an exit 28. A document enters the apparatus of the present invention at an entry point 50 and passes along a first path or track 52 to the point of divergence 26, where it is directed to one or the other of the paths 22 or 24 by a selector 54 which is biased to permit document travel along one path by means such as a spring 56, and which can be shifted to cause document travel along the other path by energization of a solenoid 58.

Each of the individual paths 22 and 24 may be similar in design to the sheet feeding apparatus disclosed and claimed in the co-pending U.S. patent application Ser. No. 334,399, filed Dec. 24, 1981, inventor Fredrik L. N. Kallin, assigned to the assignee of the present application, to which reference may be had for a more detailed description.

Figure 2:
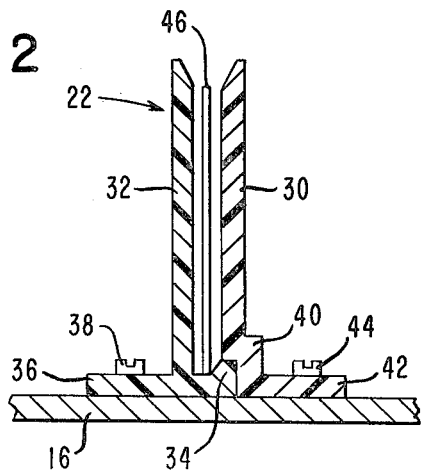
FIG. 2 is a cross-sectional view, taken along line 2—2 of FIG. 1A to show additional details of the means for guiding documents through the apparatus.

The paths 22 and 24 may be of any suitable configuration which guides and propels documents along a desired route between the point of divergence 26 and the exit 28. Path 22 may, for example, comprise a pair of spaced side walls 30 and 32 (FIG. 2). The side wall 30 has a trough portion 34 which is integrally formed therewith to form the bottom of the track 22. The side wall 32 also has a flange portion 36 extending therefrom to enable the side wall 32 to be secured to the base 16 by fasteners such as the fasteners 38.

The side wall 30 of the track 22 has a general cross-sectional shape shown in FIG. 2, including an angled or offset portion 40 to accommodate the trough portion 34 of the side wall 32. The side wall 30 also has a flange portion 42 to enable it to be secured to the base 16 by fasteners such as fasteners 44. In the embodiment described, the track 22 is oriented in a vertical plane to enable a document such as the document 46 to be guided thereby to have its long lower edge glide over the trough portions 34. The track 22 may be made of a plurality of sections (of plastic material, for example) having the cross-sectional shape described in relation to FIG. 2 to provide the necessary length of the track 22 for a particular application. It will be realized that the track 24, as well as the track 52 extending from the entry means 50 to the point of divergence 26 of the tracks 22 and 24, may be configured in a manner similar to that described above for the track 22.

In the illustrated embodiment, a document 46 is driven along the track 52 from the entry means 50 to the point of divergence 26 by a drive roller 60 cooperating with a pinch roller 62. The drive roller 60 may be driven by either or both of two motors 64 and 66 by means of belts 68 and 70. The pulleys on the shaft of the drive roller 60 which transmit its driving force from the motors 64 and 66 and the belts 68 and 70 include "over-run" clutches so that speed differences between the motors (including failure of one of the motors) can be accommodated. As will subsequently be described in greater detail, the motor 64 is employed to drive documents along the path 22, and the motor 66 is employed to drive documents 46 along the path 24. By causing the drive roller 60 to be driven by both the motors 64 and 66, the printing apparatus of the present invention can continue to function, though at a lower throughput rate, even though operation in one of the paths 22 or 24 is temporarily disabled.

The means for moving a document along the path 22 include a plurality of drive rollers 72, 74, 76, 78, 80 and 82, with cooperating pinch rollers 84, 86, 88, 90, 92 and 94. All of the drive rollers are driven by the motor 64 acting through transmission means such as a series of belts 96, 98, 100, 102, 104, 106, 108 and 110. The drive means for driving documents 46 through the printer 12 are also powered by the motor 68, and will be subsequently described.

Figure 3:
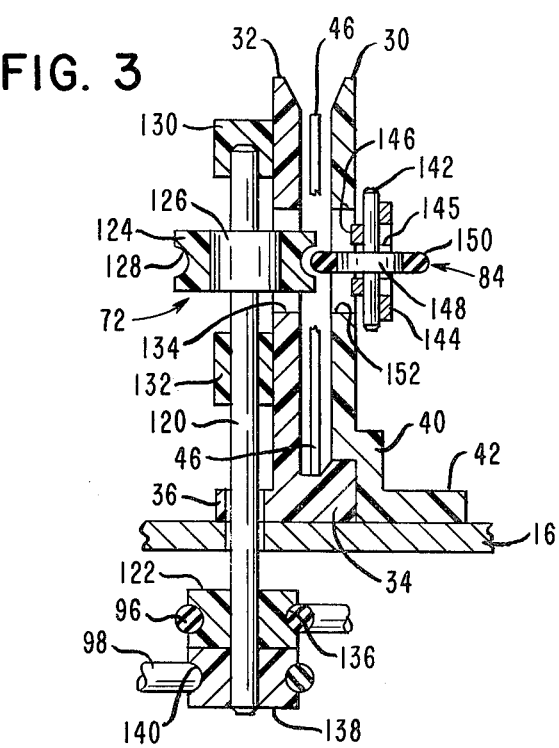
FIG. 3 is a cross-sectional view, taken along line 3—3 of FIG. 1A to show additional details of the means for moving the documents in the guiding means.

In FIG. 3, the drive roller 72 and cooperating pinch roller 84, together with associated structure, are shown in greater detail. The drive roller 72 has a shaft portion 120 having a drive pulley 122 secured to one end thereof and a wheel or tire 124 formed on an enlarged portion 126 of the shaft 120. The tire 124 is preferably made of plastic material and has an annular recess 128 formed around the perimeter thereof. The shaft 120 is rotatably supported in conventional bearing mounts 130 and 132 which are detachably secured to the side wall 32. The drive roller 72 is located on the side wall 32 so that its periphery extends through a recess 134 in side wall 32 to about midway into the track space between the side walls 30 and 32. The drive pulley 122 has an annular recess 136 formed around the perimeter thereof to receive the endless belt 96 which is circular in cross-section and which is drivingly retained in the recess 136. This belt operatively couples the pulley 122 to the motor 64. The second pulley 138 has an annular recess 140 to receive the second endless belt 98 which operatively couples the pulley 138 to a corresponding pulley which drives the drive roller 74.

The pinch roller 84 shown only schematically in FIG. 1A is shown in more detail in FIG. 3. The roller 84 has an axle 142 which is rotatably supported in a plate 144 which is adjustably secured to the side wall 30. The plate 144 has an opening 145 therein to enable the roller 84 to the mounted therein. The roller 84 may be mounted in the plate 144 by having certain flange portions like 146 formed from the plate 144 itself, thereby forming the supports for the axle 142 as is conventionally done. The axle 142 has an enlarged cylindrical portion 148 around which is formed a sleeve or tire 150 which may be made of a plastic material such as urethane. The tire 150 of the pinch roller 84 has an outer circumference whose radius of curvature is concentric with the radius of curvature of the recess 128 as is shown best in FIG. 3. When the pinch roller 84 is properly positioned with regard to the drive roller 72, it passes through an opening 152 in side wall 30 and its outer diameter is advanced slightly into the recess 128 of the drive roller 72 as shown in FIG. 3. The pinch roller 84 is resiliently biased toward the drive roller 72 by the plate 144 which is mounted in cantilever fashion.

When there is no document such as 46 passing in the track 22 between the side plates 30 and 32, the pinch roller 84 does not rotate. This minimizes wear on the roller 84 and eliminates the need for bearings for mounting it. When a document 46 passes between the drive roller 72 and the pinch roller 84, it is driven therebetween by partially deforming the sheet in the area of the recess 128 to move the sheet downstream as previously described. The rotating axes of shaft 120 of the drive roller 72 and axle 142 of the pinch roller 84 may be tilted about 2 or 3 degrees in planes parallel to the side walls 30 and 32 so as gently to drive a document 46 to the bottom of the track 22 as it is moved downstream.

The cooperating drive roller 74 and pinch roller 86 of patch 22 differ somewhat in construction and operation from the other drive roller-pinch roller combinations in said path. The pinch roller 86 is rotatably mounted at one end of a toggle 160 (FIG. 1A) pivoted between its ends on a stationary pivot pin 162 secured to the path 22. The other end of the toggle 160 is positioned to engage a pad 164 in the path 22 to exercise a blocking function to halt movement of a document 46 which is being fed along said path. The toggle 160 is operated by a solenoid 166 acting through a plunger 168 connected to said toggle. A spring 170 biases the toggle to one of its two operative positions in which the pinch roller 86 cooperates with the drive roller 74 through an aperture in the wall 30 to cause feeding of a document to the printing means 12. Energization of the solenoid 166 acts through the plunger 168 to separate the pinch roller 86 from the drive roller 74 and to cause the other end of the toggle 160 to move through an aperture in the wall 30 to engage the pad 164, thereby acting as a pinch gate to halt document feeding. The document 46 will be held against further movement until the solenoid 166 is deenergized.

The position and length of a document 46 in the path 22 may be determined by a plurality of sensors 172 and 173, as well as a sensor 174 positioned adjacent to the exit 28. Each sensor comprises a radiation source 175 and a radiation detector 176. The sources and detectors are secured to the walls 30 and 32 which are apertured to permit radiation paths to extend from each source 175 to its corresponding detector 176. Interruption of this path by a passing document 46 provides indication of the presence of the document, and the duration of such interruption enables a determination to be made of the length of the document.

Figure 4:
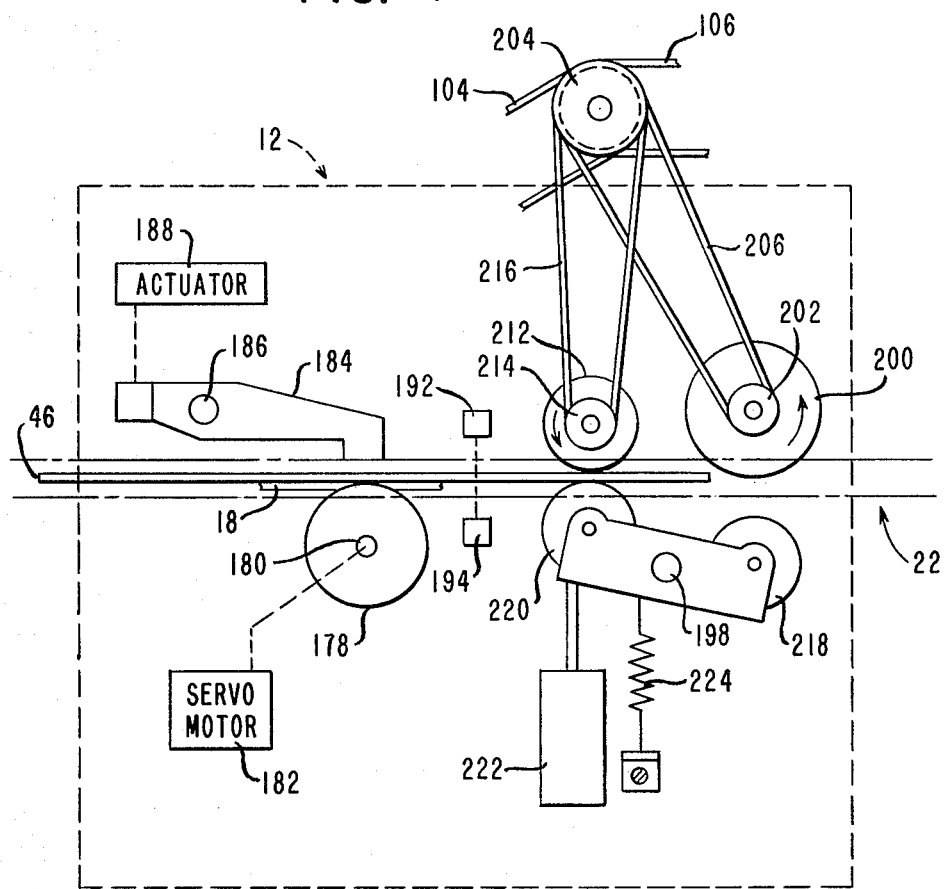
FIG. 4 is an enlarged diagrammatic view of the printing means shown in block form in FIG. 1B.

The printers 12 and 14 of FIG. 1B may, for example, be of the impact type which is shown in greater detail in FIG. 4 and which employs a platen or print hammer 184 in cooperation with a print or type wheel 178. Alternatively, the printer or recording device may be of the non-impact type, such as a thermal dot matrix printer, which requires the document to be stopped at the print station while being printed upon. Other types of non-impact recording devices may require the document to be stopped one character at a time while recording is being accomplished.

Figure 6:
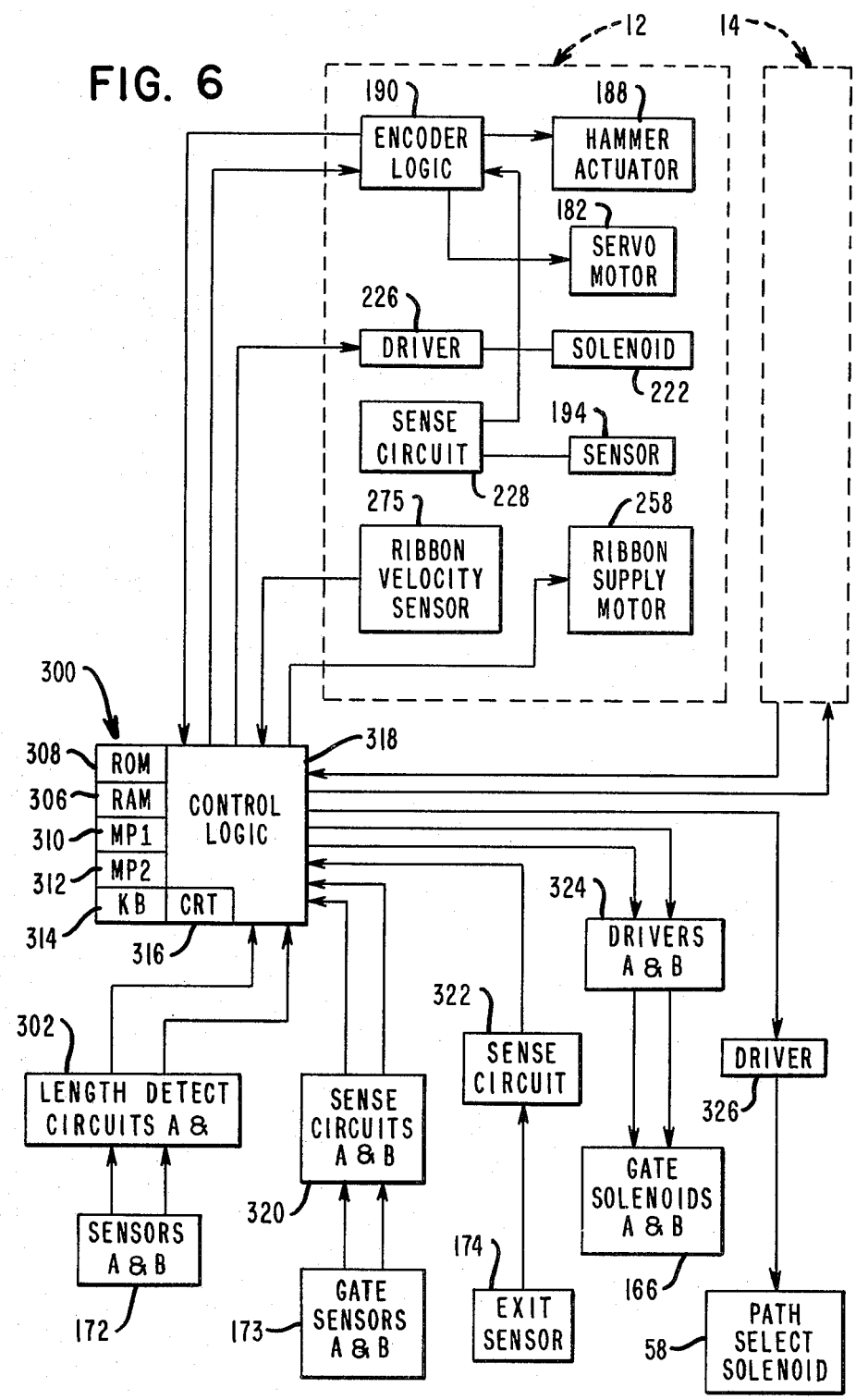
FIG. 6 is a diagrammatic view showing the manner in which various elements of the recording apparatus are electronically coupled to a controller and controlled thereby.

In the illustrated embodiment, the print hammer 184 (FIG. 4) of printer 12 is pivotally mounted on a pin 186 to enable the print hammer 184 to impact against a document such as document 46. The print or type wheel 178 is rotatably mounted on a shaft 180 which is rotated by a bi-directional servo motor 182. A ribbon 18, which will be subsequently described in greater detail, is suitably placed between the type wheel 178 and the document 46 to effect the printing. The hammer 184 is actuated each time that an associated actuator 188 is energized. The servo motor 182 and the actuator 188 are under control of conventional encoder logic 190 such as is shown in FIG. 6, and which will be subsequently described in greater detail. The encoder logic does the necessary formatting of data to be printed and issues signals to the motor 182 to rotate it so as to present a selected number, for example, thereon in printing relationship with the hammer 184. The control circuitry for printer 12 is shown in block form in FIG. 6. Similar control circuitry is employed for printer 14, which is represented as a single block 14 in FIG. 6. Circuitry for both printers communicates with the system logic means 300.

A radiation source 192 located on one side of the track 22 cooperates with a conventional associated sensor 194 located on the opposite side of said track to detect the passage of a document 46 as it is moved into printing relationship with the printer 12.

The printer 12 includes a toggle 196 which is pivotally mounted on a pivot pin 198 to enable the toggle 196 to pivot between first and second positions. The printer 12 also includes a drive roller 200 which is rotated by a drive pulley 202. Drive pulley 202 is operatively coupled by a belt 206 to a tandem drive pulley 204 which is driven by the belt 104, and which also transmits power on to subsequent drive rollers through the belt 106. Drive roller 200 is considered a high speed drive to drive a document 46 in the track at the same speed as the previously described drive rollers such as 72, 74, 76 and 78. Drive roller 212 is a slow speed drive roller and is rotated by a drive pulley 214 which is coupled to the tandem drive pulley 204 by an endless belt 216. The diameter of the slow drive roller 212 is less than that of the drive roller 200 and its diameter is chosen so as to produce the appropriate linear printing speed for moving a document 46 in the printer 12.

A pinch roller 218 is rotatably mounted on one end of the toggle 196 and a pinch roller 220 is rotatably mounted on the other end of the toggle 196. When a solenoid 222 is energized, the toggle 196 is pivoted in a clockwise direction as viewed in FIG. 4 about pivot pin 198 against the bias of spring 224 to move the pinch roller 220 into a first position; i.e. into operative relationship with the slow speed drive roller 212 during printing or encoding. When printing is completed, the encoder logic will issue a signal to the control logic which will then deenergize the solenoid 222 through its associated driver 226.

When the solenoid 222 is deenergized, the spring 224 pivots the toggle 196 from the position shown to a second position in which pinch roller 220 is uncoupled from drive roller 212 and pinch roller 218 is coupled to high speed drive roller 200 to drive the document 46 to move it out of the printer 12 to the exit 28.

The output of sensor 194 is amplified, for example, in a conventional sense circuit 228 whose output is fed to the encoder logic to initiate the printing or encoding by the printer 12.

Figure 5:
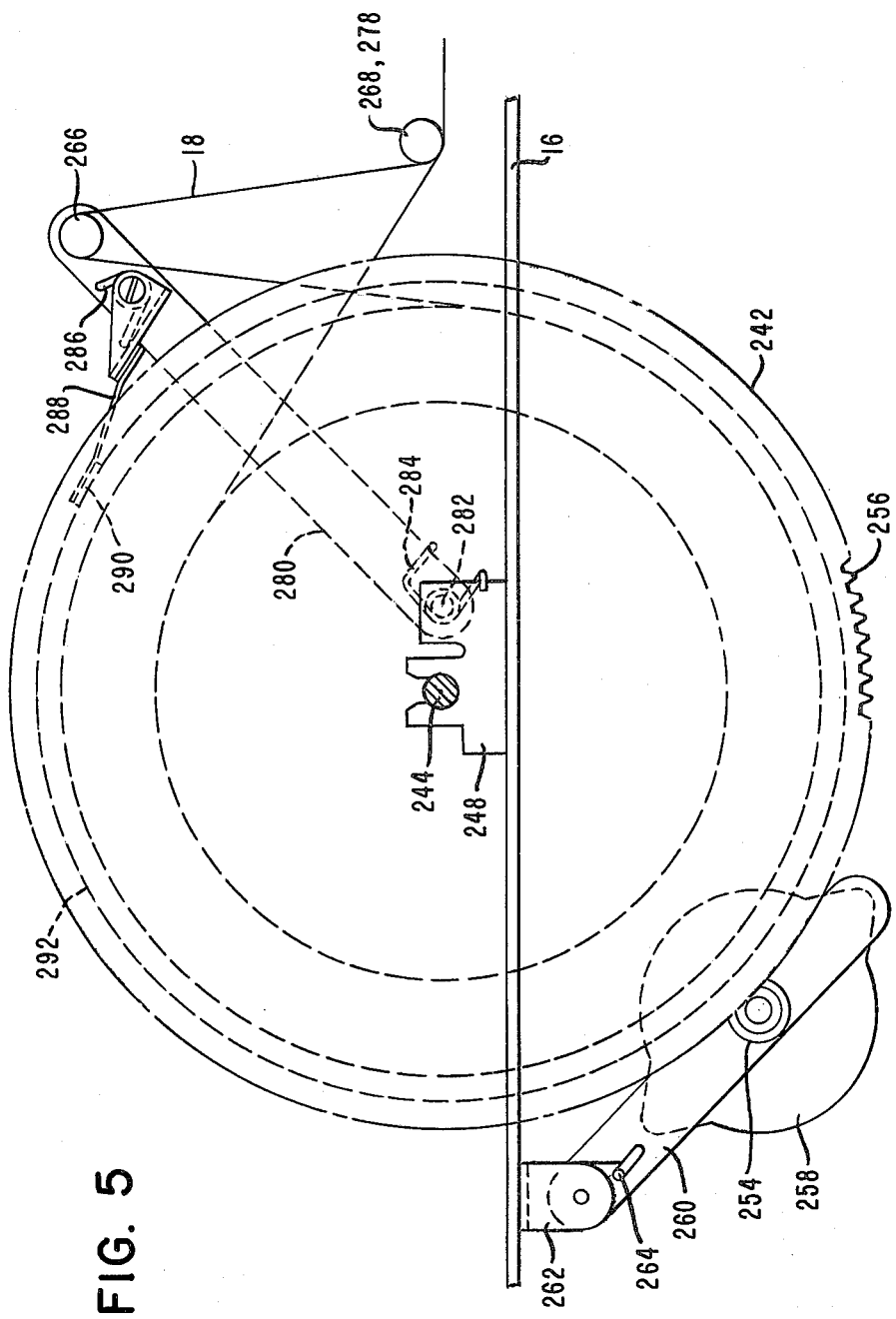
FIG. 5 is a fragmentary elevational view of the apparatus of FIG. 1, particularly showing the ink ribbon supply and take-up means.

As shown in FIGS. 1A, 1B and 5, a supply reel 240 and a take-up reel 242 associated with the printer 12 are rotatably mounted on a shaft 244 journaled in bearings 246 and 248 which are fixed to the base 16. Similarly, a supply reel 250 and a take-up reel 252 are associated with the printer 14. The reels 240 and 242 protrude in part through an aperture 254 in the base 16. A perpendicular mounting for these reels with respect to the plane of the base 16 is provided in order to enhance the compactness and space efficiency of the apparatus.

The take-up reel 242 is driven by a pinion 254 which cooperates with gear teeth 256 formed on the rim or periphery of the reel 242. The pinion 254 is driven by a motor 258 mounted on a support 260 which in turn is rotatably mounted on a bearing member 262 secured to the underside of the base 16. The support 260 and the motor 258 are urged in a counterclockwise direction by a spring 264 so that the pinion 254 is normally held in engagement with the gear teeth 256 on the periphery of the take-up roller 242. It will thus be seen that operation of the motor 258 causes the take-up reel 242 to be rotated to extract ribbon 18 from the supply reel 240, which ribbon passes through the printer 12 where it provides ink for the printing on documents 46, and is then collected on the take-up reel 242.

During its travel from the supply reel 240 to the take-up reel 242, the ribbon passes over a tensioning roll 266, a first guide pulley 268, a second guide pulley 270, a third guide pulley 272, a ribbon velocity sensor pulley 274 operatively coupled to a ribbon velocity sensor 275, a fourth guide pulley 276, and a fifth guide pulley 278 to the take-up reel 242. The tensioning roll 266 is mounted on an arm 280 which in turn is pivotally mounted by a pivot 282 on an extension of the bearing 246, and is urged in a counterclockwise direction by a spring 284. Pivotally mounted on the arm 280 and urged in a counterclockwise direction by a spring 286 is an arm 288 carrying at its free end a brake pad 290 which cooperates with a peripheral brake surface 292 on the supply reel 240.

A decrease in ribbon tension permits the arm 280 to move in a counterclockwise direction under the influence of the spring 281, thus increasing the braking force applied to the supply reel 240 by the brake pad 290. Conversely, an increase in ribbon tension tends to draw the arm 280 in a clockwise direction, thereby decreasing the force of engagement of the brake pad 290 on the brake drum surface 292 of the supply reel 240.

The sensors such as 172, 173 and 194 on the track 22, together with similar sensors on the track 24, and exit sensor 174, together with associated length detect and sense circuits 302, 320, 322 and 324, form part of the control means 300 shown in FIG. 6, which provides overall system control. In this diagram, it will be noted that sensors, gate solenoids, and other components associated with track 22 are designated "A", while similar devices associated with track 24 are designated "B". Where similar devices are included with each track 22 and 24, they are represented in FIG. 6 by a single block which includes references to both devices "A" and "B".

The control means 300 includes length detect circuits A and B 302 for determining the length of documents passing by sensors 172 in tracks 22 and 24. These circuits 302 are conventional and include, for example, oscillator and counter circuits which are activated as the documents pass the sensors. The outputs of these circuits are stored in a random access memory or RAM 306 associated with the control means 300, to be used as will be described hereinafter.

The control means 300 may be conventional and may additionally include a read only memory or ROM 308, two microprocessors 310 and 312, a keyboard 314 for providing an input of data to the apparatus 10, a display device such as a cathode ray tube 316 to enable communication with a user of the apparatus 10, and control logic 318. The necessary software for performing the processing of data associated with the apparatus 10 is stored in the ROM 308, and the sequencing of operations is performed conventionally by the ROM 308, the RAM 306, and the microprocessors 310 and 312.

The outputs of gate sensors A and B 173 are amplified by sense circuits A and B 320 and are applied to the control logic 318 to provide information concerning the presence of a document at the pinch gate areas of the tracks 22 and 24. Similarly, the output of the exit sensor 174 is amplified by a sense circuit 322 and is applied to the control logic 318 to provide information concerning the presence of a document at the exit 28.

The gate solenoids A and B 166 for the pinch gate areas of the tracks 22 and 24 are operated through drivers A and B 324 by the control logic 318, so that documents can be halted or passed to the printers 12 and 14 as required.

The path select solenoid 58 is operated through a driver 326 by the control logic 318 to control the selector 54 to cause a document entering the apparatus 10 to be directed either to track 22 or to track 24 as required.

The movement of a document along each individual track 22 and 24 and the printing of information on said document by the corresponding printer 12 or 14 is accomplished under control of the control logic 318 in a manner similar to that described in the previously-cited U.S. patent application Ser. No. 334,399.

The manner in which the control means 300 functions to direct a given document to one or the other of the tracks 22 and 24 will now be described with reference to the flow diagrams of FIGS. 7, 8A and 8B.

The following terms are used in the ensuing description. Encoder A and encoder B refer to the two encoders or printers 12 and 14 situated in tracks 22 and 24. A first memory area encoder 1 in the random access memory 306 of the control means 300 stores a number which identifies the encoder which is selected at a given time; that is, either the encoder A or the encoder B. A second memory area encoder 2 in the random access memory 306 of the control means 300 stores a number which identifies the encoder which is not selected at a given time; that is, either encoder B or encoder A.

A first timer "Time Till Complete 1" located in the control means 300 represents the time required for the encoder A or B represented in encoder 1 at a given time to complete the encoding operation and to release the encoded document. This value is computed, using a routinely developed algorithm, by one of the microprocessors 310 or 312, based upon the number of characters to be encoded on the document and the time required to encode each character, and the timer is set accordingly. The timer then must time out to zero to provide a suitable indication to other parts of the system. A similar timer "Time Till Complete 2" is provided in association with encoder 2.

Two additional timers "Time Till Release 1" and "Time Till Release 2", associated with encoder 1 and encoder 2, respectively, located in the control means 300 represent the time required before a given document held at the gate location of each of the two tracks can be released and moved to the encoding station. This value is computed by a selected or predetermined one of the microprocessors 310 or 312 in accordance with an algorithm which takes into account the current "Time Till Complete" status of both of those timers, the length of track between the gate and the encoder on each track, the length of document and the response time of the gate solenoid. Development of such an algorithm from the above and other relevant parameters, if any, is a routine task for one having ordinary skill in the art.

A third memory area "Toggle" in the random access memory 306 of the control means 300 stores a quantity representing either a "true" or a "false" condition. When the Toggle condition is true, both encoders are operational, and switching between them is permitted. When the "Toggle" condition is false, the encoder (either A or B) which is represented in the encoder 1 memory area is not operational and must not be selected.

In the track selection process for the system of the present invention, the control logic 318, functioning in conjunction with the microprocessor 310 and programs stored in system memory, is responsible for determining which track A or B, and therefore which encoder A or B, is selected in a given instance. At the start of an operation, for example, when both tracks are empty, a given one of the two tracks may always be selected for the first document by predetermined arrangement. If one track does not contain a document and the other track does, the empty track will be selected. If one track is operational and the other is not, the operational track will be selected. If both tracks contain documents and a relatively lengthy encoding operation is taking place in one track, while a relatively short encoding operation is taking place in the other track, the latter will be selected.

It should be noted that each track may contain two documents at a time, one of which is being encoded while the other is being held in the gate area, awaiting completion of the coding operation for the first document.

A "busy" signal operated by the control means controls the device which feeds documents to the system, and prevents feeding when both tracks are full. When the gate area of one of the tracks becomes empty, the "busy" signal shifts to "not busy" and another document can be fed into the system and directed to the proper track.

Similarly, the control logic determines the time at which encoding operations may commence in each track so as to eliminate the possibility of encoding operations being completed simultaneously in both tracks with a resulting collision of encoded documents at the exit. If the same time is required for encoding each of two documents, with both being held at the gate in the two tracks, one will continue to be held while the other is advanced to the encoding station of that track, so as to avoid the possibility of collision from documents on both tracks at the exit.

Figure 7:
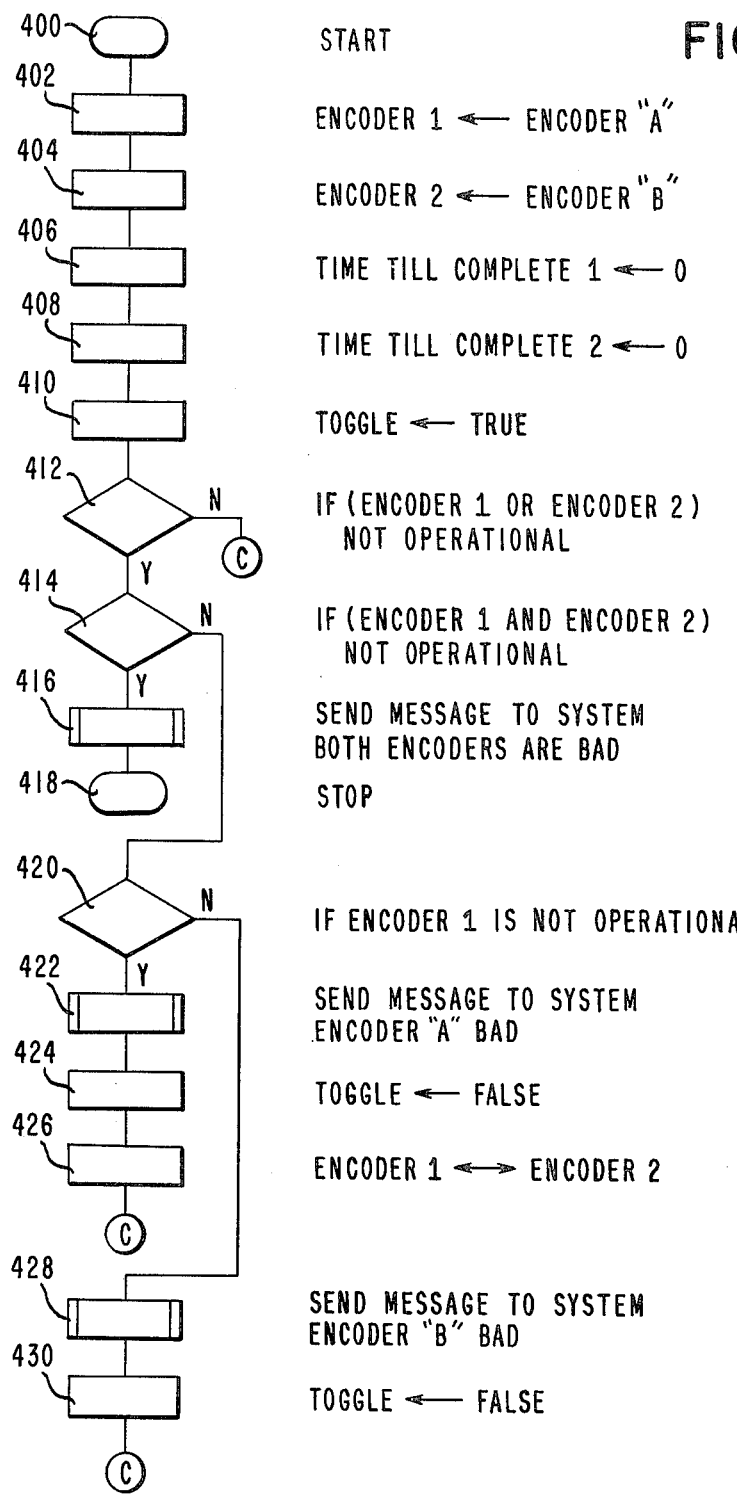
FIGS. 7, 8A and 8B, taken together, form a detailed flow diagram showing the operation of the system in directing documents to a selected one of a plurality of tracks in which recording may take place.

Referring now to FIG. 7, the system operation commences in a "start" condition, represented by block 400. Identification for encoder A is loaded into memory location ENCODER 1 and identification for encoder B is located into memory location ENCODER 2, as represented by blocks 402 and 404. The "Time Till Complete" timers 1 and 2 associated with ENCODER 1 and ENCODER 2 locations are set to 0 in steps represented by blocks 406 and 408. The "Toggle" is set to a "true" condition in a step represented by block 410, representing a condition in which both encoders are operational.

Next, a determination is made as to whether or not both encoders are in fact operational, as represented by decision block 412 which tests whether one of the encoders is not operational. If both of the encoders are operational, the "no" branch from block 412 is taken to symbol "C", from whence the process continues through another series of steps, generally designated "FOREVER" shown in FIGS. 8A and 8B, as will subsequently be described. However, if at least one of the encoders is in fact not operational, the yes branch from block 412 is taken, leading to block 414, where a further determination is made as to whether or not both of the encoders are not operational. If both encoders are not operational, the process proceeds to block 416, in which a message that both encoders are not operational is sent to the external system feeding documents to the system 10, so that no further documents will be fed until the situation is corrected. The process then stops as indicated in block 418.

On the other hand, if only one of the encoders is not operational, the process proceeds to block 420 in which a determination as to whether the encoder designated "ENCODER 1" (as distinguished from "ENCODER 2") is operational.

In the event that the "ENCODER 1" is not operational, the process proceeds to block 422, in which a message is sent to the external system that encoder A is "bad", or not operational. Next, as represented by block 424, "Toggle" is set to "false", indicating that the selected encoder is not operational, after which the contents of the ENCODER 1 and ENCODER 2 storage areas are switched, as represented in block 426. The process may then continue as shown in FIGS. 8A and 8B, as represented by the connecting symbol C.

Returning to block 420, if ENCODER 1 is operational, the process continues to the step represented by block 428, in which a message is sent to the system, indicating that encoder B is bad. Following this, "Toggle" is set to "false", as represented by block 430 and the process may then continue as shown in FIGS. 8A and 8B, as represented by the connecting symbol C.

Figure 8A:
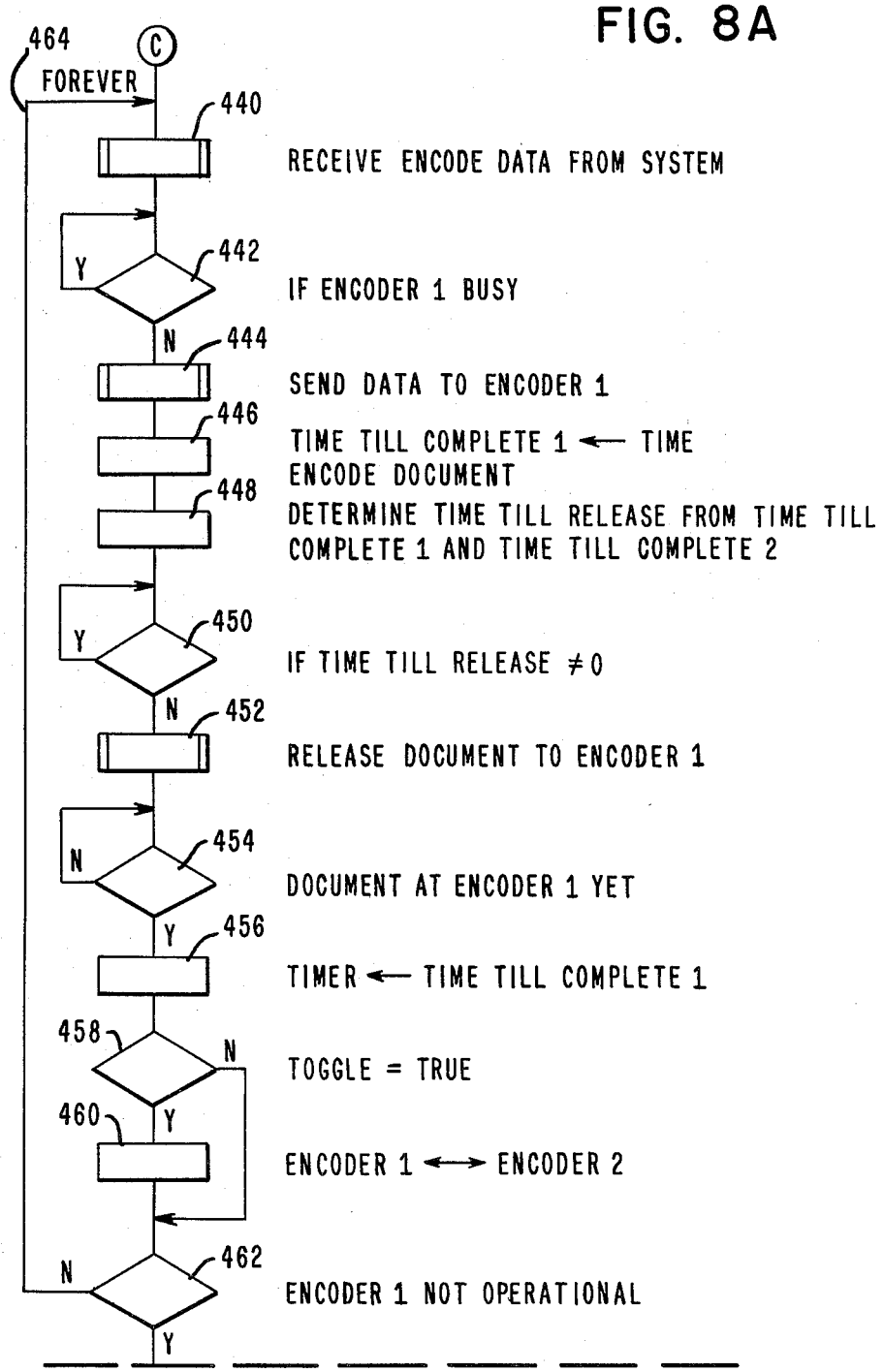

From the connecting symbol C at the top of the flow diagram of FIG. 8A, the process continues through the operations required for proper track selection in view of the variable conditions prevailing at any given time. The loop 464 marked "FOREVER" which rejoins the main line of the flow diagram just below the connecting symbol C indicates that the process of track selection can continue for as long as required for document processing so long as at least one encoder is operational and additional documents continue to be presented to the system.

As indicated by block 440, it is first necessary to receive the data to be encoded from the external system. The process then goes into a waiting mode until the operational selected encoder whose identity has been stored in "ENCODER 1" is not longer busy processing the previous document, as represented by decision block 442. When the encoder of "ENCODER 1" is no longer busy, the data to be encoded is sent to a buffer from where it is transmitted to the encoder identified in ENCODER 1, as represented by block 444.

From the data which has been sent to the system, a determination is made, as represented in block 446, by the previously mentioned algorithm as to the time required to complete the encoding operation for the data for a document, based on such variables as length of data and printing speed. This calculated value is then placed in the storage area "Time Till Complete 1".

Next, the value "Time Till Release" for the selected track is determined in the step represented in block 448 using the values "Time Till Complete 1" and "Time Till Complete 2". In the first encoding operation, "Time Till Complete 2" was set equal to 0, as was "Time Till Complete 1", and in subsequent operations these values for the two encoders are calculated from "time to encode document" as described above and then stored until replaced during a subsequent operation.

Following this, a determination is made, as shown in block 450, as to whether or not the "Time Till Release" is equal to zero. The value of "Time Till Release" is decremented by a timer within the system, and the process stays in a waiting mode until "Time Till Release" becomes equal to 0, after which the system acts through the gate solenoid 166 to release the document being held and to transport it to the encoder, as represented by block 452.

The process then waits until the document arrives at the encoder, as represented by the block 454. After document arrival, a timer is set to a value equal to the previously-determined "Time Till Complete 1", as represented in block 456, and commences running.

A determination is then made, in block 458, as to whether "Toggle" is ture; that is, whether or not both encoders are operational. If so, the number stored in "ENCODER 1" is changed from the previously-selected encoder to the other encoder, as represented in block 460, in effect selecting the other encoder for the next operation. If one of the encoders is not operational, this switching operation is omitted. In either case, the process continues to a determination, as represented in block 462, of whether or not the selected encoder is operational. This additional verification is helpful to proper system operation since the encoder may have become inoperative during the previous operation by reason of such cause as exhaustion of ink ribbon, for example. If the selected encoder is operational, the process returns via loop 464 to block 440, and this portion of the process is repeated.

Figure 8B:
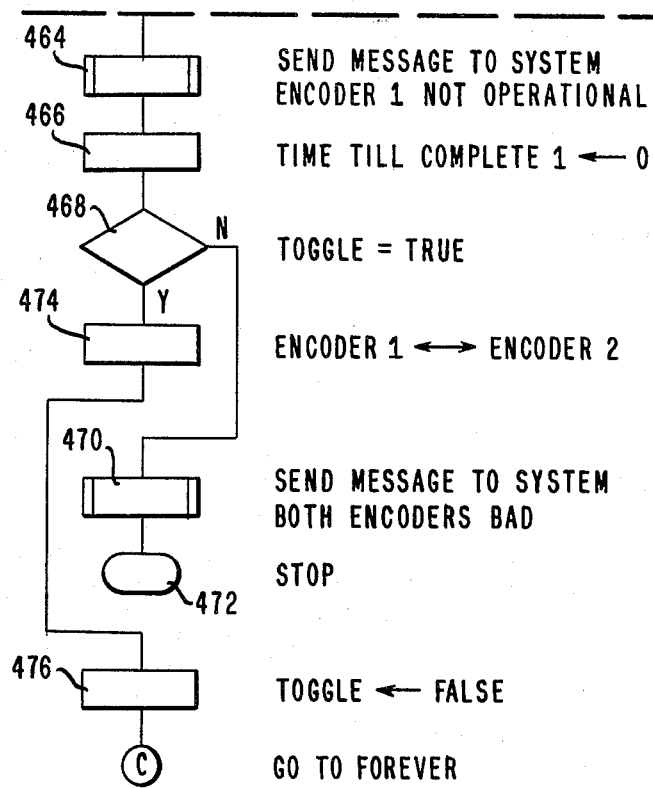

If the selected encoder is not operational, the process continues to a step represented by block 464 in FIG. 8B, in which a message is sent to the external system specifying which encoder A or B is not operational.

The "Time Till Complete" value for ENCODER 1 is also set equal to 0, as represented in block 466. Next, a determination is made whether "Toggle" is "true", as represented by block 468. If not, a message is sent to the external system indicating that both encoders are not operational, as represented by block 470 and the process halts, as represented by the "stop" block 472.

If "Toggle" is true, the two encoder identities are switched, as represented in block 474, and the "Toggle" is set to "false", as represented in the block 476, after which the process returns to the portion of the routine in which additional encode data is received from the external system, as indicated by the symbol "C", which appears in FIGS. 8A and 8B. This routine is repeated so long as there is additional encode data in the external system to be processed.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

We claim:

1. Apparatus for recording data on documents comprising:
    a plurality of document feed paths;
    a corresponding plurality of drive means for driving documents along said plurality of feed paths;
    recording means associated with each of said feed paths for recording on said documents;
    selection means for selecting a desired one of said feed paths for a given document which is introduced to the apparatus;
    movement control means operatively associated with each of said drive means for controlling the movement of documents passing along said feed paths;
    detector means operatively associated with each of said feed paths for determining the presence and location of documents therein; and
    controller means responsive to said detector means for controlling the selection means, the movement control means for each path and the recording means for each path, to enable the commencement of recording on a document in one feed path before recording of a document in another feed path has been completed.

2. The apparatus of claim 1 in which the controller means includes document encoding timing means for each path and further includes document release timing means for each path which is set in accordance with the settings of all of said document encoding timing means.

3. The apparatus of claim 1 in which there are a total of two document feed paths, in which the documents are introduced to the apparatus in a single entrance path, and in which the selection means is operative to cause a given document to be directed from the entrance path to a selected one or the other of the two document feed paths.

4. The apparatus of claim 1 in which the controller means controls the relative movement of documents with respect to each other in various feed paths to control the order in which the documents which have been recorded on appear at the exit.

5. The apparatus of claim 3, also including an entrance drive means for driving documents from the entrance path to the selected document feed path.

6. The apparatus of claim 5, in which a separate motive means is provided for each document feed path driving means.

7. The apparatus of claim 6, in which the entrance drive means is driven by both of the motive means for the two document feed path driving means.

8. The apparatus of claim 7, in which overrun clutches are provided for coupling the entrance drive means to the two motive means.

* * * * *

UNITED STATES PATENT AND TRADEMARK OFFICE
CERTIFICATE OF CORRECTION

PATENT NO. : 4,431,322

DATED : February 14, 1984

INVENTOR(S) : Robert B. Nally, et al.

It is certified that error appears in the above—identified patent and that said Letters Patent is hereby corrected as shown below:

Column 1, Under "SUMMARY OF THE INVENTION", delete entire second paragraph.

Column 1, Under "SUMMARY OF THE INVENTION", after the first paragraph, insert following paragraph:

--In accordance with one embodiment of the invention, apparatus for recording data on documents comprises a plurality of document feed paths; a corresponding plurality of drive means for driving documents along said plurality of feed paths; recording means associated with each of said feed paths for recording on said documents; selection means for selecting a desired one of said feed paths for a given document which is introduced to the apparatus; movement control means operatively associated with each of said drive means for controlling the movement of documents passing along said feed paths; detector means operatively associated with each of said feed paths for determining the presence and location of documents therein; and controller means responsive to said detector means for con-

UNITED STATES PATENT AND TRADEMARK OFFICE
CERTIFICATE OF CORRECTION

PATENT NO. : 4,431,322

DATED : February 14, 1984

INVENTOR(S) : Robert B. Nally, et al.

It is certified that error appears in the above—identified patent and that said Letters Patent is hereby corrected as shown below:

trolling the selection means, the movement control means for each path and the recording means for each path, to enable the commencement of recording on a document in one feed path before recording of a document in another feed path has been completed.--

Signed and Sealed this

Twenty-fourth Day of July 1984

[SEAL]

*Attest:*

GERALD J. MOSSINGHOFF

*Attesting Officer*     *Commissioner of Patents and Trademarks*